United States Patent
Kim et al.

(10) Patent No.: US 7,022,540 B2
(45) Date of Patent: Apr. 4, 2006

(54) CANTILEVER SENSOR AND FABRICATION METHOD THEREOF

(75) Inventors: Tae Song Kim, Seoul (KR); Hyung Joon Kim, Seoul (KR); Jeong Hoon Lee, Seoul (KR); Ji Yoon Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 322 days.

(21) Appl. No.: 10/448,188

(22) Filed: May 30, 2003

(65) Prior Publication Data
US 2003/0224551 A1 Dec. 4, 2003

(30) Foreign Application Priority Data
May 30, 2002 (KR) ............... 10-2002-0030340

(51) Int. Cl.
*H01L 21/00* (2006.01)
(52) U.S. Cl. ............... 438/50; 438/52; 438/459
(58) Field of Classification Search ............... 438/666, 438/685, 761, 778, 787, 791, 928, 976, 977, 438/5, 10, 48, 50, 52, 57, 66, 73, 98, 459, 438/381, 238, 652, 656; 257/414–470, 528, 257/619, 622
See application file for complete search history.

(56) References Cited

U.S. PATENT DOCUMENTS

| | | | | |
|---|---|---|---|---|
| 5,095,401 A | * | 3/1992 | Zavracky et al. | 361/283.4 |
| 5,177,661 A | * | 1/1993 | Zavracky et al. | 361/283.4 |
| 5,493,470 A | * | 2/1996 | Zavracky et al. | 438/53 |
| 5,855,801 A | * | 1/1999 | Lin et al. | 216/2 |
| 6,706,203 B1 | * | 3/2004 | Barth et al. | 216/33 |
| 2002/0020053 A1 | * | 2/2002 | Fonash et al. | 29/623.1 |

* cited by examiner

Primary Examiner—Lynne A. Gurley
Assistant Examiner—Andre' Stevenson
(74) Attorney, Agent, or Firm—McDermott Will & Emery LLP

(57) ABSTRACT

In a cantilever sensor and a fabrication thereof, by forming piezoelectric films on the same surface, it is possible to sense various information by an electric measuring method. The cantilever sensor comprises a first silicon nitride film formed onto the top surface of a silicon substrate; a silicon oxide film formed onto the first silicon nitride film; a lower electrode formed onto the silicon oxide film; a first piezoelectric film and a second piezoelectric film formed onto the lower electrode, the second piezoelectric film formed out of contact with the first piezoelectric film; an upper electrode respectively formed onto the first and second piezoelectric films; a protecting film formed onto the silicon oxide film, the lower electrode, the first and second piezoelectric films and the upper electrode; a first and a second openings respectively formed on the protecting film on the upper electrode and the protecting film on the lower electrode; a first and a second contact pads respectively formed at the first and second openings; a T-shaped sensing portion formed at the end of a cantilever; a second silicon nitride film formed on the bottom surface of the silicon substrate.

21 Claims, 4 Drawing Sheets

CANTILEVER SENSOR AND FABRICATION METHOD THEREOF

BACKGROUND OF THE INVENTION

1. Field of the Invention

The present invention relates to a cantilever sensor and a fabrication method thereof.

2. Description of the Prior Art

Recently, since a miniaturized sensor fabricated by MEMS (micro electronic mechanical system) process has quick response and high sensitivity and is appropriate to mass production, it has become the object of interest.

By applying semiconductor minute process techniques where processes such as deposition and etching are performed repeatedly, the MEMS process enables a mass-production of low-cost micro products which has lower power consumption and more accurate operation in comparison with the existing bulk type products. Accordingly, importance of the MEMS process is growing greater day by day with the advent of nano-techniques and SOC (system on chip) techniques.

In order to sense physical phenomenon or chemical reaction, researches into a cantilever sensor fabricated by the MEMS process are actively going on.

Most of the conventional cantilever sensors perform measurement by sensing resonance frequency variation or static deflection due to heat or mass variation using a light source such as laser. However, in the conventional sensor using a light source such as laser, there is a limit to reduce a size of the sensor because of the light source and optical system installation.

FIG. 1 illustrates the conventional cantilever sensor using a light source. When an operating portion 11 of the cantilever sensor senses resonance frequency variation or static deflection due to heat or mass variation of a sensing material 12, laser light is focused by a light source 13 and a sensing signal from the operating portion 11 is detected by a position sensing diode 14.

Since the conventional sensor includes the light source 13 for measuring a signal generated from the operating portion 11; and the position sensing diode 14 for collecting light as a detector, it is difficult to reduce a size of a sensing system.

In addition, in order to sense biomass such as DNA or protein, several gold patterns are formed as an array pattern onto a substrate such as glass, silicon wafer, etc. so as to form a bio recognition organic molecular film thereon, and accordingly a surface modification process is performed. When an object sensing biomass as a probe is combined with an analyte material, fluorescent light is generated by a labeled dye material in irradiation of laser, etc., and the fluorescent is sensed by a light sensing detector (or scanner). However, since the system also needs a light source and a detector as well as an optical system for focusing light, it is difficult to minimize the system.

SUMMARY OF THE INVENTION

In order to solve the above-mentioned problem, it is an object of the present invention to provide a cantilever sensor that is capable of reducing a size of a system by sensing an electric signal instead of a light signal.

It is another object of the present invention to provide a cantilever sensor fabrication method which is capable of simplifying processes and forming a sensor and a piezoelectric cell on the same surface by fabricating a cantilever in one wafer using a Si or a $Si_3N_4$ film having low stress.

It is yet another object of the present invention to provide a cantilever sensor which is capable of reducing stress variation in measurement due to reaction material stuck onto a cantilever and increasing sensitivity by improving a spring constant using a compound film of good elasticity such as $Si/SiO_2$ or $Si/Si_3N_4$.

It is still another object of the present invention to provide a cantilever sensor which is capable of preventing Q value lowering due to viscous damping in liquid and maintaining sensitivity by increasing a spring constant and improving an operational ability of a micro cantilever by increasing characteristics of a piezoelectric film.

It is a further object of the present invention to provide a cantilever sensor that is capable of providing good sensing characteristics by forming a probe on not only a surface at which a sensor and an operating film are formed but also the opposite surface.

It is a yet further object of the present invention to provide a cantilever sensor which eliminates spring constant variation due to surface absorption in sensing and enables sensing of weight variation by forming a separate portion, on which a biomass probe is mounted, at the end of a cantilever, and also increases a sensing area by forming the separate portion in T-shape.

It is a still further object of the present invention to provide a cantilever sensor which is capable of measuring not only resonance frequency variation in a sensing unit but also a quantity of electric charge or voltage variation or a quality factor value in operation of an operating portion.

A cantilever sensor in accordance with the present invention comprises: a first silicon nitride film formed onto the top surface of a silicon substrate; a silicon oxide film formed onto the first silicon nitride film; a lower electrode formed onto the silicon oxide film; a first piezoelectric film and a second piezoelectric film formed onto the lower electrode; an upper electrode respectively formed onto the first and second piezoelectric films; a protecting film formed onto the silicon oxide film, the lower electrode, the first and second piezoelectric films and the upper electrode; a first and a second openings respectively formed on the protecting film on the upper electrode and the protecting film on the lower electrode; a first and a second contact pads respectively formed at the first and second openings; and a second silicon nitride film formed on the bottom surface of the silicon substrate.

In addition, a fabrication method of a cantilever sensor in accordance with the present invention comprises: depositing a silicon nitride film respectively onto the top and the bottom surfaces of a silicon substrate; depositing a silicon oxide film onto the top silicon nitride film; depositing a lower electrode onto the silicon oxide film; depositing a first piezoelectric film and a second piezoelectric film onto the lower electrode so as not to contact with each other; depositing an upper electrode respectively onto the first and second piezoelectric films; depositing a protecting film onto the silicon oxide film, the lower electrode, the first and second piezoelectric films and the upper electrodes; forming a first opening on the protecting film of the upper electrode and forming a second opening on the protecting film of the lower electrode; forming a first and second contact pads respectively on the first and second openings; removing part of the silicon nitride film on the bottom surface of the substrate; forming a membrane of predetermined thickness by etching the silicon substrate in which the silicon nitride film is removed; and forming a cantilever by removing part of the membrane by etching the surrounding portion of cantilever.

Moreover, the step of forming a membrane of predetermined thickness further comprises forming a Si/Si$_3$N$_4$ double film. At this time, a SOI (silicon on insulator) wafer can be used in order to facilitate the thickness adjustment, and instead of the silicon nitride film a silicon oxide film can be deposited onto the front and back surfaces of the silicon wafer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE
PREFERRED EMBODIMENT

A cantilever sensor fabrication method in accordance with the present invention includes a method using a thin film and a method using a thick film.

Figure 1:
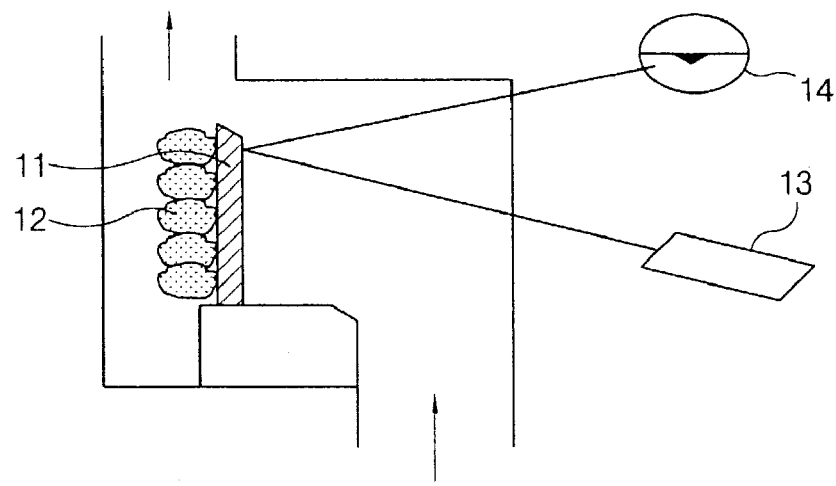
FIG. 1 is a schematic view illustrating the conventional cantilever sensor using light.
Figure 2A:
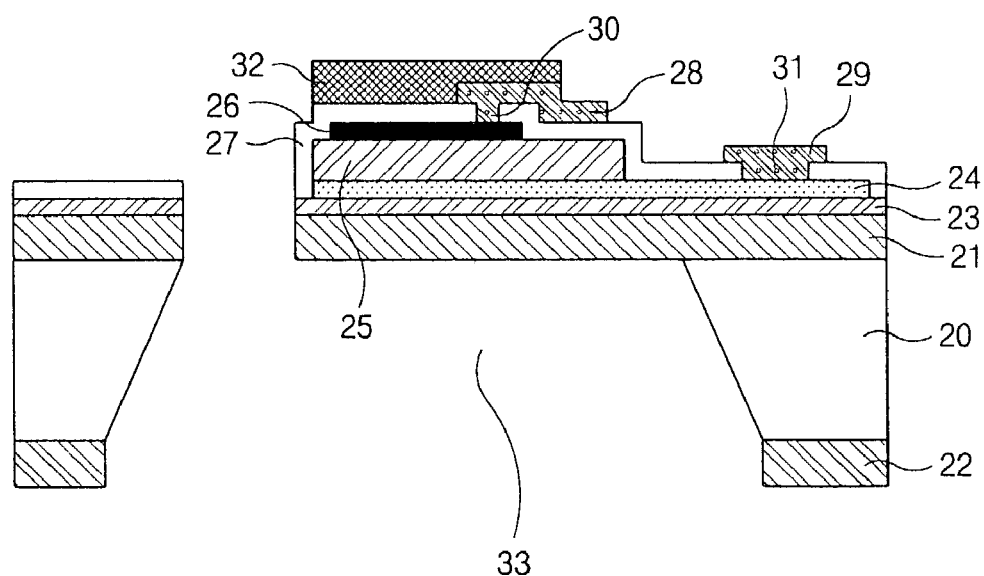
FIG. 2a is a sectional view illustrating a cantilever sensor using a piezoelectric thin film in accordance with the present invention.

FIG. 2a is a sectional view illustrating a cantilever sensor using a piezoelectric thin film in accordance with the present invention. The cantilever sensor is fabricated by following processes.

First, in order to protect a silicon substrate 20 from an etching solution, silicon nitride films (SiN$_x$) 21, 22 are deposited onto the top and bottom surfaces of the silicon substrate 20.

Next, a silicon oxide film (SiO$_2$) 23 is deposited onto the silicon nitride film 21 by a LPCVD (low-pressure chemical vapor deposition) method or a PECVD (plasma enhanced chemical vapor deposition) method. The silicon oxide film 23 has a thickness between 500 and 4000 Å. Herein, the silicon oxide film 23 serves to improve adhesive property between the silicon nitride film 21 and the PZT film when forming a piezoelectric material, a PZT film acting as an operating film and a sensing film onto the silicon nitride film 21. If a silicon oxide film is formed onto the both side of the silicon substrate 20 instead of the silicon nitride film, it does not need to deposit an additional oxide film.

Next, a lower electrode (Pt) 24 is deposited onto the silicon oxide film 23 so as to have an area usable as a cantilever sensor. And, in order to improve adhesive property of the lower electrode 24, a Ta layer is deposited onto the silicon oxide film 23 so as to form a Ta/Pt compound. The Ta layer has a thickness between 100 and 500 Å.

Afterward, a piezoelectric film 25 of the cantilever sensor is deposited onto the lower electrode 24 by using material having good piezoelectricity such as Pb-based piezoelectric material group or ZnO. The present invention employs Sol-gel method using Diol as a solvent in order to form a thick piezoelectric film at once, but also may use a different solvent by increasing sol concentration. The piezoelectric film 25 has a thickness between 0.3 and 2 μm, and preferably between 0.4 and 1 μm for a thin film type piezoelectric cantilever.

An upper electrode 26 is deposited onto the piezoelectric film 25 by a sputtering method or an E-beam deposition method.

Next, a SiO$_2$ film 27 is deposited onto the upper electrode 26. The SiO$_2$ film 27 is used as a mask in order to perform etching and patterning in order of the upper electrode 26, the piezoelectric film 25 and the lower electrode 24 with photoresist and makes those piezoelectric cells passive electrically. The SiO$_2$ film 27 is deposited by the PECVD method or a low temperature LPCVD method or the E-beam deposition method or the sputtering method.

Next, openings 30, 31 of a predetermined size are formed on SiO$_2$ film 27, respectively corresponding to the upper electrode 26 and the lower electrode 24, and then contact pads 28, 29 are respectively formed in the openings 30, 31. The contact pads 28, 29 are electric connection pads for applying a signal for operation of the upper and lower electrodes 26, 24 or measuring a signal.

Next, an Au layer 32 on which a biomass probe is attached is deposited by a lift-off method, and then the upper side process is complete.

Next, in the silicon nitride film 22 formed on the other surface of the silicon substrate 20, an area corresponding to the deposition area of the piezoelectric film 25 is removed. Herein, in order to protect the films on the top surface of the silicon substrate 20 from an etching solution, a special jig is used, and accordingly only the bottom surface of the silicon substrate 20 is exposed. The bottom surface of the silicon substrate 20 is immersed in the etching solution so as to remove some part thereof, and accordingly a membrane 33 of predetermined thickness is formed. The silicon substrate etching method includes a wet etching method using a KOH solution, a TMAH solution or an ion reaction etching method or an ion beam etching method, etc.

Next, after patterning on the front surface and releasing the cantilever from the piezoelectric film 25 with a predetermined distance by a RIE (reactive ion etching) method, the fabrication process is complete. It is preferable to release the upper electrode 24 and the piezoelectric film 25 so as not to be exposed.

Figure 2B:
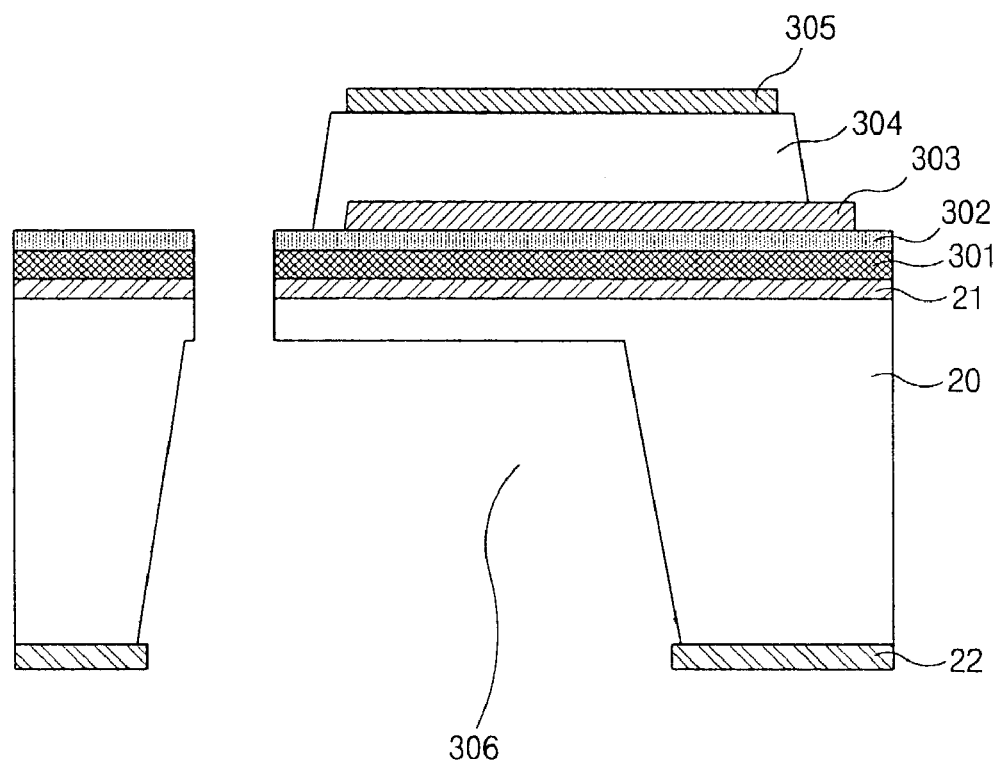
FIG. 2b is a sectional view illustrating a cantilever sensor using a piezoelectric thick film in accordance with the present invention.

FIG. 2b is a sectional view illustrating a cantilever sensor using a piezoelectric thick film in accordance with the present invention. The fabrication method is similar to the above-described method (using a thick film as the piezoelectric film 25), however the fabrication orders are a little different.

First, the nitride films 21, 22 are respectively deposited onto the top and bottom surfaces of the silicon substrate 20, and some area of the silicon nitride film 22 is patterned and etched out, and then immersed in an etching solution in order to remove part thereof. Herein, it is also possible to use a silicon oxide film instead of the silicon nitride film.

Next, a membrane 306 of predetermined thickness (5~30 μm) is formed by a fabrication method similar to the fabrication method in FIG. 2a. A thickness of the membrane 306 may vary according to a thickness of a piezoelectric thick film.

Next, a diffusion preventing layer, a YSZ (Yttria Stabilized Zirconia) layer 301 is deposited onto the silicon nitride film 21 with the CVD or the sputtering or the Sol-gel method. The YSZ layer has a thickness between 500 and 1000 Å.

Next, an adhesive layer 302 made of Ti, $TiO_2$, Ta, etc. is formed, and a lower electrode Pt layer 303 is formed onto the adhesive layer 302. Preferably, the lower electrode Pt layer 303 has a thickness between 1500 and 3500 Å.

Next, a piezoelectric thick film 304 is formed with a screen printing method. The piezoelectric thick film 304 has a thickness between 2 and 50 μm, and preferably between 10 and 30 μm as a sensor. The subsequent fabrication processes are the same as those of the piezoelectric thin film fabrication method.

Figure 3A:
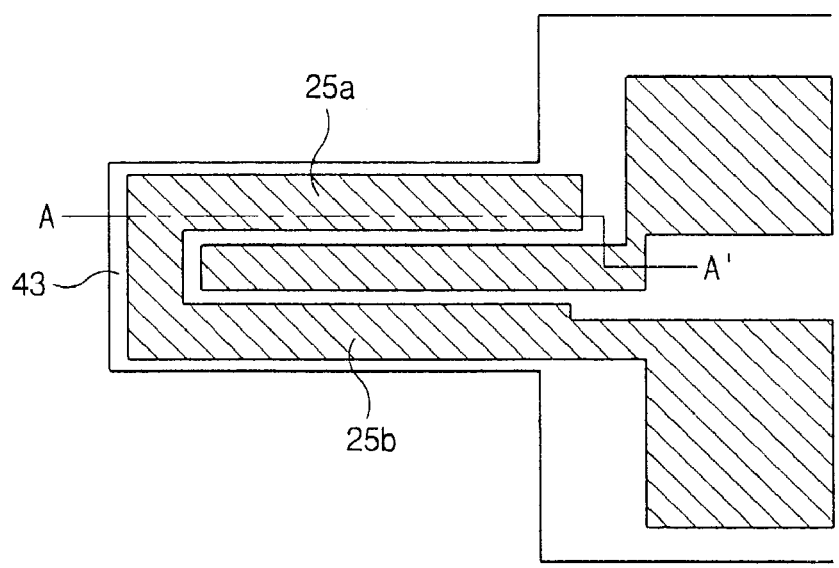
FIG. 3a is a plan view illustrating an embodiment of a cantilever sensor in accordance with the present invention.

FIG. 3a illustrates a plan view of a cantilever sensor in accordance with the present invention and more particularly, the cantilever sensor after releasing the cantilever and forming the piezoelectric film 25. As depicted in FIG. 3a, the piezoelectric film 25 consists of a first piezoelectric film 25a and a second piezoelectric film 25b formed on the same plane surface out of contact with each other. Note that the piezoelectric film 25 seems to comprise one element in drawings since FIG. 2a is a sectional view taken along the line A–A' in FIG. 3a, however, it consists of the first piezoelectric film 25a and the second piezoelectric film 25b. As depicted in FIG. 3a, as long as the first piezoelectric film and the second piezoelectric film exist on the same plane out of contact with each other, any shape satisfies the condition of the present invention. In addition, for the same piezoelectric layer, not separated as $1^{st}$ and $2^{nd}$ piezoelectric film, the actuator and sensor can also be separated with separated upper electrode, i.e. $1^{st}$ electrode for sensor and $2^{nd}$ electrode for actuator, or $1^{st}$ electrode for actuator and $2^{nd}$ electrode for sensor.

Accordingly, after depositing the piezoelectric film 25, the upper electrode 26 is deposited with a predetermined area onto the first and second piezoelectric films 25a, 25b, respectively. The silicon oxide film 27 is deposited on the exposed portions of the piezoelectric films 25a, 25b, the upper electrode 26 and the exposed portion of the lower electrode 24. Accordingly, the silicon oxide film 27 is deposited between the first and second piezoelectric films 25a, 25b.

One of the first and second piezoelectric films 25a, 25b is an operating film (actuator) for operating the cantilever sensor; the other is a sensing film (sensor) for sensing various information through the cantilever sensor. The structure of first and second piezoelectric films 25a, 25b simplifies the fabrication process of the sensor. That is, since the operating film is driven well by electric signals applied from the outside and at this time the sensing film performs the sensing operation, a light source is not required as in the conventional sensor, thereby reducing a size of the sensor.

In addition, when releasing the cantilever sensor, an analyte binding portion 43 for sensing is formed at the end of the cantilever sensor.

Figure 3B:
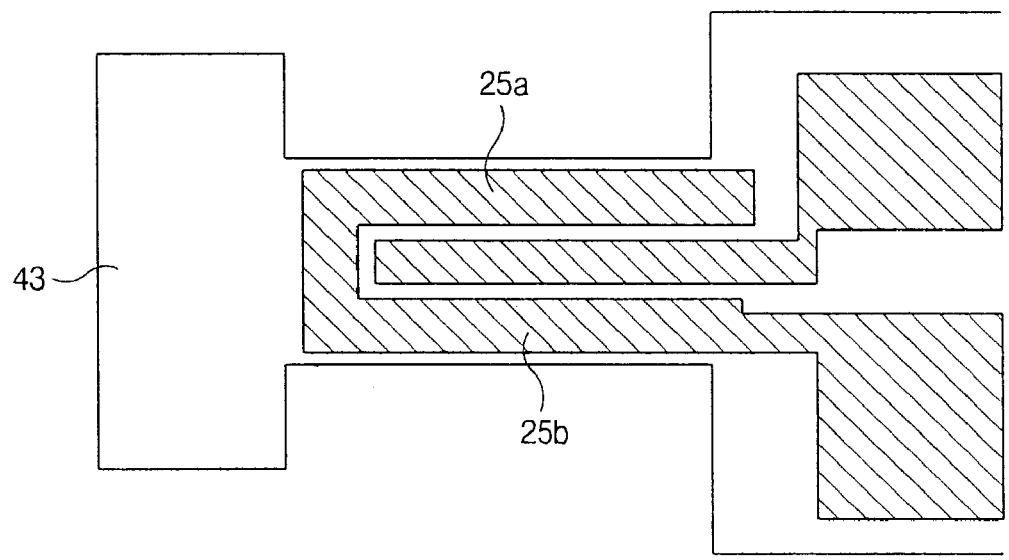
FIG. 3b is a plan view illustrating another embodiment of a cantilever sensor in accordance with the present invention.

FIG. 3b illustrates a plane view of another cantilever sensor in accordance with the present invention. The analyte binding portion 43 is shaped into T-type to increase a sensing area of a sensing material such as biomass and decrease cantilever stiffness variation due to absorption of the biomass on the end of cantilever, not beam area of cantilever, as compared with the I-shaped portion in FIG. 3a. When biomass is separately bound to the end of the cantilever sensor besides where the sensor and actuator are arranged, it is advantageous to reduce the complex effect of sensing characteristics caused by mechanical property variation of cantilever due to biomass on the operating portions. That is why the analyte binding portion 43 is formed at the end of the cantilever sensor.

Figure 4:
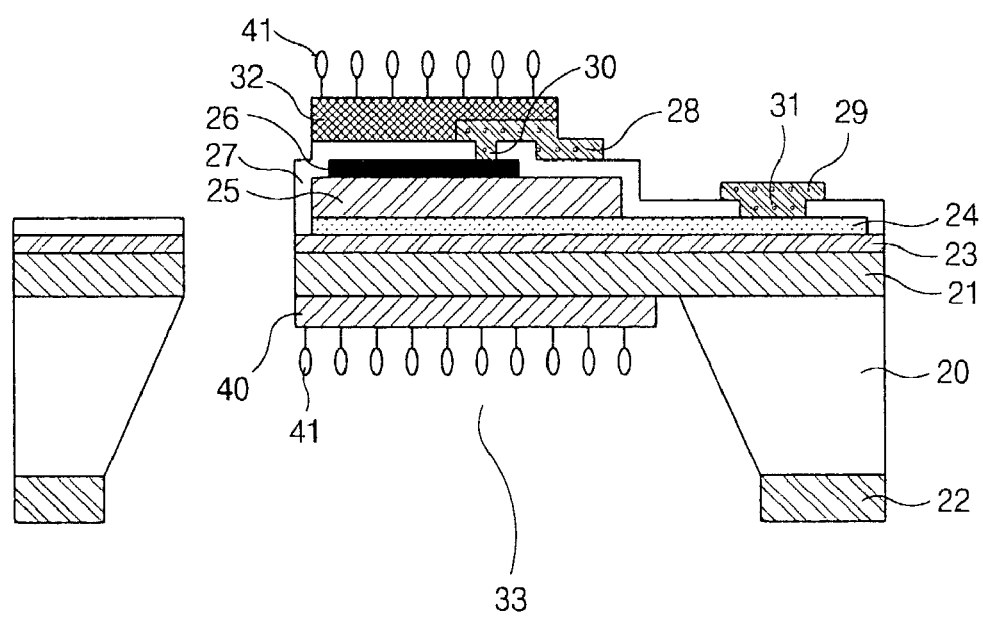
FIG. 4 is a sectional view illustrating yet another embodiment of a cantilever sensor in accordance with the present invention.

FIG. 4 is a sectional view illustrating yet another embodiment of a cantilever sensor in accordance with the present invention. As depicted in FIG. 4, an Au layer 40 is deposited onto the surface at which the membrane 33 is formed and then a sensing probe 41 is respectively adhered to the Au layers 32, 40. The Au layer 40 at the opposite surface of the cantilever can be formed before or after releasing the cantilever. As described above, by forming a sensing probe on the back surface of the cantilever, sensing can be performed with the both front and back surfaces, thereby improving sensitivity of the sensor.

Figure 5A:
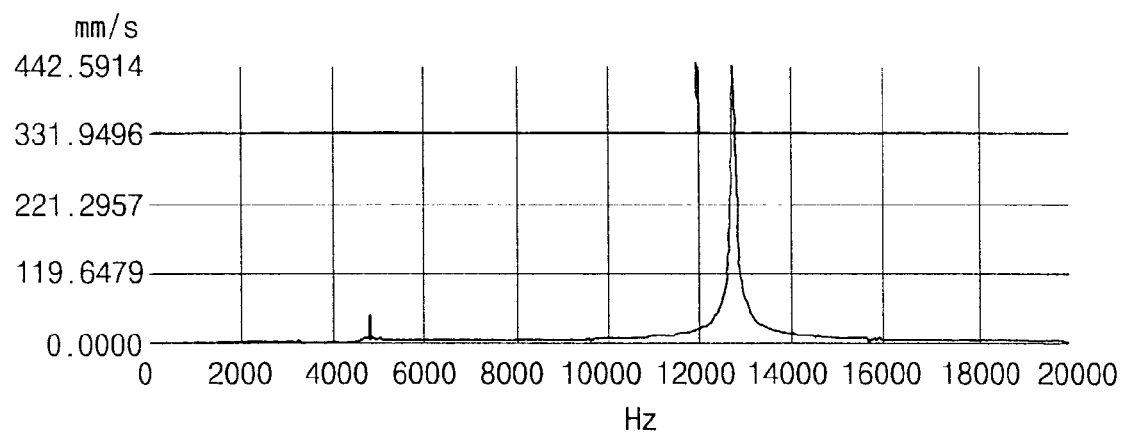
FIG. 5a is a graph showing a measurement result of a resonance frequency of the cantilever sensor in accordance with the present invention.
Figure 5B:
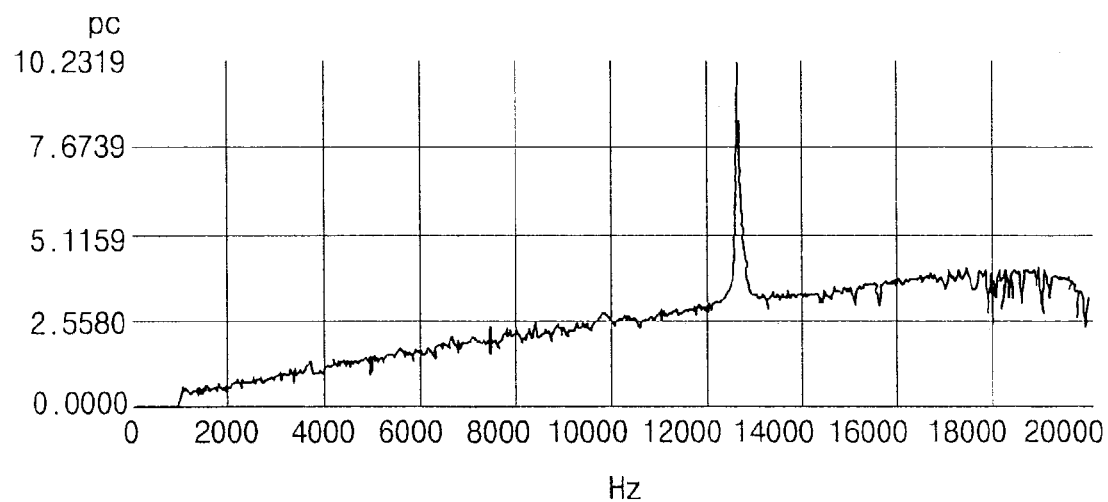
FIG. 5b is a graph showing a measurement result of a quantity of electric charge of the cantilever sensor in accordance with the present invention.

FIG. 5a is a graph showing a measurement result of a resonance frequency of the cantilever sensor in accordance with the present invention, and FIG. 5b is a graph showing a measurement result of a quantity of electric charge of the cantilever sensor in accordance with the present invention. Herein, the cantilever sensor has a size of 200 μm×200 μm and a thickness of 1.5 μm, and uses $Si_3N_4$ film having low stress.

The cantilever sensor in accordance with the present invention can measure a quantity of electric charge (charge Q) or voltage variation or quality factor value variation besides resonance frequency variation as a physical quantity. When a vibration speed of the cantilever is measured by applying a sine waveform (±0.5V signal) to the operating film and using a laser vibrometer, the speed is sharply increased at a resonance point of which a frequency is a resonance frequency. In FIG. 5a, a resonance frequency is within the range of 12~13 kHz. Moreover, in FIG. 5b, a quantity of electric charge occurring in the sensing film according to variation of frequency applied to the operating film is shown. At the resonance point, a sharp increase of a quantity of electric charge is distinctly shown, and accordingly it can be known the operating film and the sensing film are operated normally.

A thickness of the operating film and the sensing film can be variously determined according to a thickness of the cantilever.

In case of forming the thin piezoelectric film, it can be deposited by the Sol-Gel method, the sputtering method or the general CVD method. In case of forming the thick piezoelectric film, it can be deposited by the screen printing method, sol-gel or the general CVD method.

After depositing the upper electrode 26 onto the piezoelectric film 25, a protecting layer such as a silicon oxide film ($SiO_2$) or a silicon nitride film ($SiN_x$) or a silicon carbide film (SiC) can be coated thereon to protect the devices and avoid a contact with solutions. Herein, the upper and lower electrodes 26, 24 respectively deposited onto the top and bottom surfaces of the piezoelectric film 25 can be made of platinum or oxide such as $RuO_2$ or $SrRuO_3$.

The above-described cantilever sensor can be applied to various sensors by employing particular sensing films.

For example, when a sensing film for absorbing moisture is deposited onto the cantilever, it functions as a high sensitive humidity sensor. When a sensing film for absorbing mercury is deposited onto the cantilever, it functions as a mercury-sensing sensor. When a sensing film for absorbing various gases is used, it functions as a high sensitive gas sensor.

According to the present invention, the cantilever sensor performs a measurement sensing electric signals, thereby reducing a size of a sensor sharply and facilitating mass production.

In addition, the present invention improves sensing characteristics by binding biomass onto the surface where an operating portion and a sensing portion is arranged and onto the opposite surface simultaneously. The present invention also improves sensing characteristics by forming a T-shaped cantilever, thereby increasing sensing material binding area.

Moreover, the present invention prevents variation of mechanical property caused by sensing material bound onto the operating and sensing portions by mounting a sensing material only onto the T-shaped portion, and provides a quick sensing reply speed by performing operating and sensing simultaneously.

In addition, using various sensing films, the present invention provides a biochip, a humidity sensor, a mercury-sensing sensor, a high sensitive gas sensor and a mass sensor for sensing a weight from several picogram to several microgram.

What is claimed is:

1. A fabrication method of a cantilever sensor, comprising:
    depositing a silicon nitride film respectively onto the top and the bottom surfaces of a silicon substrate;
    depositing a silicon oxide film onto the top silicon nitride film;
    depositing a lower electrode onto the silicon oxide film;
    depositing a first piezoelectric film and a second piezoelectric film onto the lower electrode so as not to contact with each other;
    depositing an upper electrode respectively onto the first and second piezoelectric films;
    depositing a protecting film onto the silicon oxide film, the lower electrode, the first and second piezoelectric films and the upper electrodes;
    forming a first opening on the protecting film of the upper electrode and forming a second opening on the protecting film of the lower electrode;
    forming a first and second contact pads respectively on the first and second openings;
    removing part of the silicon nitride film on the bottom surface of the substrate;
    forming a membrane of predetermined thickness by etching the silicon substrate in which the silicon nitride film is removed; and
    forming a cantilever by removing part of the membrane by etching the surrounding portion of the cantilever.

2. The method of claim 1, wherein the lower electrode comprises Pt, and the method further comprising a step for depositing an adhesive layer onto the silicon oxide film before depositing the lower electrode.

3. The method of claim 2, wherein the adhesive layer comprises Ta.

4. The method of claim 1, wherein a thickness of the piezoelectric films is within the range of 0.3~2 μm.

5. The method of claim 1, further comprising:
    forming an Au layer onto the protecting film of the upper electrode and the first contact pad respectively; and
    forming an Au layer onto the backside of the cantilever.

6. The method of claim 5, further comprising:
    adhering a biomass probe onto the Au layers.

7. The method of claim 1, wherein the cantilever forming step comprises:
    forming an analyte binding portion for mounting a sensing material on the end of the cantilever by performing the etching with a distance from the second piezoelectric film.

8. The method of claim 7, wherein the analyte binding portion is shaped into T-type.

9. The method of claim 1, wherein the protecting film comprises at least one of a silicon oxide film, a silicon nitride film and a silicon carbonization film.

10. The method of claim 1, wherein the upper and lower electrodes comprise at least one of platinum and conductive oxide.

11. A fabrication method of a cantilever sensor, comprising:
    depositing a silicon nitride film respectively onto the top and the bottom surfaces of a silicon substrate;
    removing part of the silicon nitride film on the bottom surface of the substrate;
    forming a membrane of a predetermined thickness by etching the silicon substrate in which the silicon nitride film is removed;
    depositing a YSZ layer onto the top silicon nitride film;
    depositing a lower electrode onto the YSZ layer;
    depositing a first piezoelectric film and a second piezoelectric film onto the lower electrode so as not to contact with each other;
    depositing an upper electrode respectively onto the first and second piezoelectric films;
    depositing a protecting film onto the YSZ layer, the lower electrode, the first and second piezoelectric films and the upper electrode;
    forming a first opening on the protecting film of the upper electrode and forming a second opening on the protecting film of the lower electrode; and
    forming a first and second contact pads respectively on the first and second openings.

12. The method of claim 11, wherein the lower electrode comprises Pt, and the method further comprises a step for depositing an adhesive layer onto the silicon oxide film before depositing the lower electrode.

13. The method of claim 12, wherein the adhesive layer contains Ta.

14. The method of claim 11, wherein a thickness of the YSZ layer is within the range of 500~1000 Å.

15. The method of claim 11, wherein a thickness of the piezoelectric films is within the range of 2~50 μm.

16. The method of claim 11, further comprising:
    forming an Au layer onto the protecting film of the upper electrode and the first contact pad respectively; and
    forming an Au layer onto the backside of the cantilever.

17. The method of claim 16, further comprising:
    adhering a biomass probe onto the Au layers.

18. The method of claim 11, wherein the cantilever forming step comprises:
    forming an analyte binding portion for mounting a sensing material on the end of the cantilever by performing the etching with a distance from the second piezoelectric film.

19. The method of claim 18, wherein the analyte binding portion is shape into T-type.

20. The method of claim 11, wherein the protecting film comprises at least one of a silicon oxide film, a silicon nitride film and a silicon carbonization film.

21. The method of claim 12, wherein the upper and lower electrodes comprise at least one of platinum and conductive oxide.

* * * * *